(12) United States Patent
Van Vlassenrode et al.

(10) Patent No.: US 12,331,530 B2
(45) Date of Patent: Jun. 17, 2025

(54) FLOORING ELEMENT

(71) Applicant: Flooring Industries Limited, SARL, Bertrange (LU)

(72) Inventors: Kristof Van Vlassenrode, Deinze (BE); Jurgen Goessens, Dalton, GA (US)

(73) Assignee: Unilin BV, Wielsbeke (BE)

( * ) Notice: Subject to any disclaimer, the term of this patent is extended or adjusted under 35 U.S.C. 154(b) by 190 days.

(21) Appl. No.: 17/757,118

(22) PCT Filed: Nov. 27, 2020

(86) PCT No.: PCT/IB2020/061231
§ 371 (c)(1),
(2) Date: Jun. 9, 2022

(87) PCT Pub. No.: WO2021/116815
PCT Pub. Date: Jun. 17, 2021

(65) Prior Publication Data
US 2023/0010679 A1   Jan. 12, 2023

Related U.S. Application Data

(60) Provisional application No. 62/958,981, filed on Jan. 9, 2020.

(30) Foreign Application Priority Data

Dec. 10, 2019 (BE) .................... 2019/5882

(51) Int. Cl.
*E04F 15/10*  (2006.01)
*B32B 7/12*   (2006.01)
(Continued)

(52) U.S. Cl.
CPC ............. *E04F 15/107* (2013.01); *B32B 7/12* (2013.01); *B32B 21/08* (2013.01); *B32B 27/08* (2013.01);
(Continued)

(58) Field of Classification Search
CPC ... E04F 15/107; E04F 15/0215; E04F 15/105; E04F 15/102; B32B 7/12; B32B 21/08;
(Continued)

(56) References Cited

U.S. PATENT DOCUMENTS 4,599,841 A    7/1986  Haid
4,817,963 A    4/1989  Munden
(Continued)

FOREIGN PATENT DOCUMENTS

DE    29710175 U1    8/1997
DE    10044016 A1    3/2002
(Continued)

OTHER PUBLICATIONS

International Searching Authority, International Search Report and Written Opinion for International Application No. PCT/IB2020/061231, dated Apr. 29, 2021, (16 pages), European Patent Office, Rijswijk, Netherlands.

*Primary Examiner* — Omar F Hijaz
(74) *Attorney, Agent, or Firm* — Alston & Bird LLP

(57) ABSTRACT

Floor element comprising a top layer (102) attached to a substrate layer (104), in which the top layer (102) is itself layered, the top layer (102) comprising: —an optional backing layer (122) made of flexible polymer, —a flexible or semi-rigid polymer layer (124), onto or into which optionally at least one reinforcing layer (126) is attached or embedded, and —a finishing layer comprising a decorative layer (132), a wearing layer (134) thereon and optionally a coating (136) thereon; the substrate layer (104) being a rigid substrate layer.

15 Claims, 1 Drawing Sheet

(51) Int. Cl.
*B32B 21/08* (2006.01)
*B32B 27/08* (2006.01)
*B32B 27/30* (2006.01)
*B32B 29/06* (2006.01)
*E04F 15/02* (2006.01)

(52) U.S. Cl.
CPC .......... *B32B 27/304* (2013.01); *B32B 29/06* (2013.01); *E04F 15/0215* (2013.01); *E04F 15/105* (2013.01); *B32B 2260/021* (2013.01); *B32B 2260/046* (2013.01); *B32B 2305/08* (2013.01); *B32B 2315/085* (2013.01); *B32B 2317/12* (2013.01); *B32B 2317/16* (2013.01); *B32B 2327/06* (2013.01); *B32B 2471/00* (2013.01)

(58) Field of Classification Search
CPC ....... B32B 27/08; B32B 27/304; B32B 29/06; B32B 2260/021; B32B 2260/046; B32B 2305/08; B32B 2315/085; B32B 2317/12; B32B 2317/16; B32B 2327/06; B32B 2471/00; B32B 5/024; B32B 5/18; B32B 5/245; B32B 13/00; B32B 13/02; B32B 13/045; B32B 13/12; B32B 13/14; B32B 21/02; B32B 21/047; B32B 21/10; B32B 27/00; B32B 27/22; B32B 27/302; B32B 2255/10; B32B 2255/26; B32B 2262/101; B32B 2266/0228; B32B 2266/0235; B32B 2266/025; B32B 2266/0257; B32B 2266/0264; B32B 2307/10; B32B 2307/102; B32B 2307/4023; B32B 2307/50; B32B 2307/536; B32B 2307/546; B32B 2307/554; B32B 2307/718; B32B 2307/72; B32B 2307/732; B32B 2307/734; B32B 2307/75; B32B 2419/04; B32B 27/32; B32B 27/34; B32B 27/36; B32B 27/365; B32B 27/40; B32B 5/022
See application file for complete search history.

(56) References Cited

U.S. PATENT DOCUMENTS

| | | |
|---|---|---|
| 6,363,677 B1 | 4/2002 | Chen |
| 6,711,864 B2 | 3/2004 | Erwin |
| 9,611,659 B2 | 4/2017 | Baert |
| 10,059,072 B2 | 8/2018 | Hannig |
| 10,526,798 B2 * | 1/2020 | Lombaert .......... E04F 13/0866 |
| 10,677,275 B1 * | 6/2020 | Caselli .................. F16B 5/0016 |
| 2002/0108343 A1 | 8/2002 | Knauseder |
| 2002/0121064 A1 | 9/2002 | Erwin |
| 2002/0170258 A1 | 11/2002 | Schwitte |
| 2003/0024200 A1 | 2/2003 | Moriau |
| 2004/0003888 A1 * | 1/2004 | Mott .................... B44C 3/123 |
| | | 156/307.3 |
| 2004/0020159 A1 | 2/2004 | Nelson |
| 2004/0229020 A1 | 11/2004 | LaBorde |
| 2007/0006543 A1 | 1/2007 | Engstrom |
| 2007/0102108 A1 * | 5/2007 | Zheng .................... B32B 37/12 |
| | | 156/272.2 |
| 2008/0000188 A1 | 1/2008 | Pervan |
| 2008/0245014 A1 | 10/2008 | Carter |
| 2010/0247861 A1 | 9/2010 | Mitchell |
| 2011/0183101 A1 | 7/2011 | Voith |
| 2012/0066996 A1 | 3/2012 | Konstanczak |
| 2012/0240502 A1 | 9/2012 | Wilson |
| 2012/0276348 A1 * | 11/2012 | Clausi .................. B32B 29/002 |
| | | 428/524 |
| 2014/0360117 A1 | 12/2014 | Ko |
| 2018/0194919 A1 * | 7/2018 | Wu ....................... C09D 123/14 |
| 2018/0320388 A1 * | 11/2018 | Lombaert ............. B32B 27/308 |
| 2018/0339504 A1 | 11/2018 | Ziegler |
| 2019/0153734 A1 | 5/2019 | Van Vlassenrode |
| 2019/0292793 A1 | 9/2019 | Van Vlassenrode et al. |
| 2022/0389722 A1 * | 12/2022 | Van Essche ............. B05D 1/38 |

FOREIGN PATENT DOCUMENTS

| | | | |
|---|---|---|---|
| DE | 10045475 A1 | 4/2002 | |
| DE | 20120704 U1 | 4/2002 | |
| DE | 102004054785 A1 | 7/2006 | |
| DE | 102005017392 A1 | 10/2006 | |
| DE | 102006029796 A1 | 1/2008 | |
| DE | 202015100159 U1 | 1/2015 | |
| DE | 202010018341 U1 | 10/2015 | |
| EP | 1584770 A1 | 10/2005 | |
| JP | 2009035934 A | 2/2009 | |
| WO | WO 9858142 A1 | 12/1998 | |
| WO | WO 2011/141849 A2 | 11/2011 | |
| WO | WO 2012/004699 | 1/2012 | |
| WO | WO 2015/005860 A1 | 1/2015 | |
| WO | WO-2018/007932 A2 | 1/2018 | |
| WO | WO-2018/172959 A2 | 9/2018 | |
| WO | WO-2018198034 A1 * | 11/2018 | ............. B29C 43/24 |
| WO | WO 2020/075111 | 4/2020 | |
| WO | WO-2020114645 A1 * | 6/2020 | ............. B32B 13/10 |

\* cited by examiner

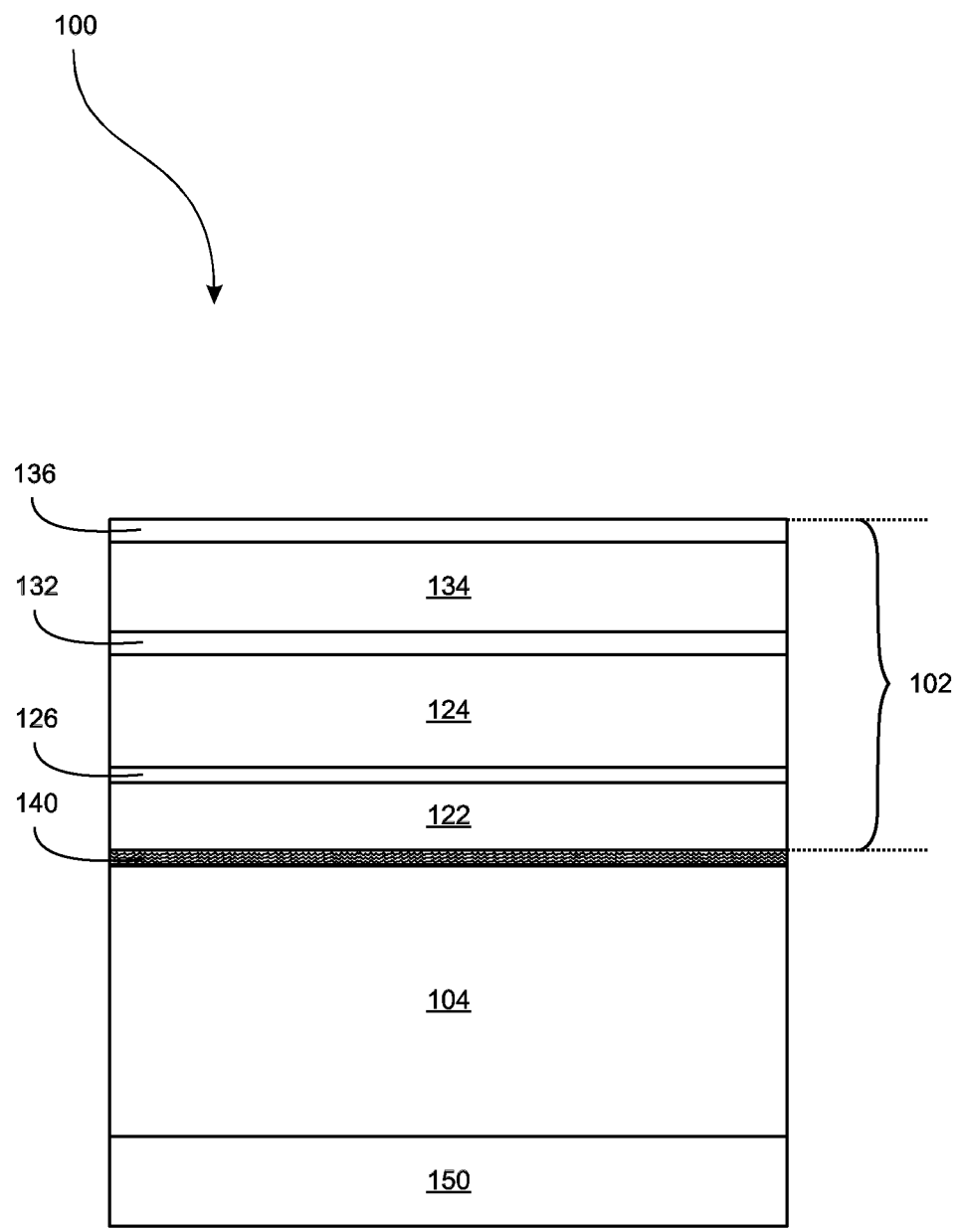

FLOORING ELEMENT

CROSS REFERENCE TO RELATED APPLICATIONS

This application is a 35 U.S.C. § 371 national stage of International Application No. PCT/IB2020/061231, filed Nov. 27, 2020, which claims the benefit of priority to U.S. Provisional Application No. 62/958,981, filed Jan. 9, 2020 and BE Provisional Application No. 2019/5881, filed Dec. 10, 2019, which are herein incorporated by reference in their entirety for all purposes.

The invention relates to floor elements, more specifically to floor elements with a rigid substrate.

Floor elements with a rigid substrate on which a decorative layer is applied directly are known from among others WO2018/172959. Floor elements of this kind may be judged to have a rather negatively perceived sound reflection property.

According to a first aspect of the invention, a floor element is provided comprising a top layer attached to a substrate layer, in which the top layer itself is layered, the top layer comprising an optional backing layer made of flexible polymer,
a flexible or semi-rigid polymer layer, onto or into which optionally at least one reinforcing layer is attached or embedded, and
a finishing layer comprising a decorative layer, a wearing layer thereon and optionally a coating thereon;
the substrate layer being a rigid substrate layer.

According to some embodiments, at least one reinforcing layer may be attached to or embedded in the flexible or semi-rigid polymer layer.

"Rigid" means that the layer or layers together sag less than 35 cm under their own weight when the layer or layers project 1 meter beyond a fixing point. Preferably, the substrate layer sags less than 10 cm under its own weight, when projecting 1 meter beyond the fixing point.

The top layer is preferably a sheet vinyl.

The sheet vinyl used in this aspect of the invention is typically of layered construction, and comprises an optional backing layer made of flexible PVC,
a flexible or semi-rigid PVC layer, onto or into which at least one reinforcing layer is attached or embedded, and
a finishing layer comprising a decorative layer, a wearing layer and optionally a coating on the outer side.

Optionally the flexible or semi-rigid PVC layer comprises a reinforcing layer, for example a textile reinforcing layer, for example reinforcing layers as described for the reinforcing layers of the subfloor according to the first aspect of the invention.

Moreover, in the context of the present invention, flexible polymer, for example PVC, means polymer, e.g. PVC, that comprises 40 or more than 40 phr of plasticizers. Semi-rigid or semi-flexible polymers, e.g. PVC, means polymers, e.g. PVC that comprise between 10 and 40 phr of plasticizers, whereas rigid polymers, e.g. PVC, comprise less than or exactly 10 phr.

Generally, in the context of the present invention, plasticizers are inter alia esters of carboxylic acids (for example esters of phthalic acid, iso- or terephthalic acid, trimellitic acid and adipic acid), for example diisononyl phthalate (DINP), dioctyl terephthalate (DOTP), diisononyl-1,2-cyclohexane dicarboxylate (DINCH), esters of phosphoric acid, for example triaryl or trialkaryl phosphates, for example tricresyl phosphate, chlorinated or unchlorinated hydrocarbons, ethers, polyesters, polyglycols, sulfonamides, or combinations thereof.

The optional backing layer consists of flexible PVC and typically has a thickness of more than 0.5 mm, for example between 0.5 mm and 5 mm, for example between 0.75 mm and 2.5 mm. The material of which this backing layer consists comprises, besides PVC, also fillers (up to 60 wt % relative to the total PVC material, for example about 50 wt %) and additives, and preferably more than 40 phr of plasticizer, more specifically more than 50 phr of plasticizer. The backing layer may or may not be foamed, and may for example have a density between 0.3 g/cm$^3$ and 1.9 g/cm$^3$.

The flexible or semi-rigid PVC layer, onto or into which optionally a reinforcing layer is attached or embedded, comprises or is preferably a fibrous web that is impregnated with PVC. The PVC used for impregnating the fibrous web partly or preferably completely is preferably flexible PVC. The PVC comprises, besides the polymer, also fillers (up to for example 75 wt % or up to 50 wt % relative to the total PVC material, for example up to about 40 wt %) and additives, and preferably more than 40 phr of plasticizer, more specifically more than 50 phr of plasticizer. The thickness of this layer may be up to 0.6 mm but is preferably between 0.20 mm and 0.40 mm, such as about 0.30 mm. The density of the PVC used is preferably less than 1.9 g/cm$^3$, for example such as between 1.4 g/cm$^3$ and 1.7 g/cm$^3$, for example between 1.5 g/cm$^3$ and 1.6 g/cm$^3$. As the web, preferably a glass-fiber web (nonwoven) is used that has about the same thickness as this layer. The preferred web has a thickness of 0.3 mm and a weight per unit area from 35 g/m$^2$ to 50 g/m$^2$.

Preferably a layer of PVC is also attached to this impregnated glass-fiber web. The PVC used may be almost identical, but is preferably foamed. This layer may have a thickness from 0.5 mm to 3 mm. Typically this PVC layer comprises 45 to 75 phr of plasticizers, for example 55 to 65 phr of plasticizer, and 50 to 200 phr of filler, preferably 100 to 125 phr of filler. The filler is preferably white in color, so that a white layer of PVC is formed.

Besides glass-fiber webs, glass fiber fabrics may also be used.

The finishing layer typically comprises a decorative layer, a wearing layer and optionally a coating on the outer side.

The decorative layer possibly comprises flexible PVC with a thickness of between 0.09 mm and 0.6 mm, for example between 0.4 mm and 0.6 mm. It may be a PVC layer (for example a film) that is printed with a decorative pattern. The PVC used may be flexible PVC. Besides polymer, this PVC layer also comprises additives and fillers (up to 50 wt % relative to the total PVC composition), and plasticizers, preferably more than 40 phr, more specifically more than 50 phr of plasticizer. The PVC may or may not be foamed, but is preferably foamed. If a foamed PVC material is used, the PVC layer may have a density below 1 g/cm$^3$, such as between 0.5 and 0.8 g/cm$^3$. In the case of unfoamed PVC, the density is preferably between 1 g/cm$^3$ and 1.6 g/cm$^3$, such as between 1.2 g/cm$^3$ and 1.4 g/cm$^3$. The layer may be supplied as film, whether or not pre-printed, as emulsion or (micro-) suspension polymerization layers, by calendering or as a plastisol layer.

Optionally it is printed directly on the flexible or semi-rigid PVC layer. This is especially applicable if the flexible or semi-rigid PVC layer is provided with an extra PVC layer (whether or not foamed), on top of a reinforcing layer of glass-fiber web impregnated with PVC.

A wearing layer, the thickness of which may be selected for example between 0.15 mm and 1.0 mm, for example between 0.2 mm and 0.55 mm, is provided on this decorative layer. It may preferably be a flexible or semi-rigid PVC layer, for example a film. Preferably no fillers are added or used, and the layer is transparent. Besides polymer, this PVC layer also comprises additives and plasticizers, preferably more than 20 phr, more specifically more than 30 phr of plasticizer. Plasticizers up to 40 phr may be provided in this PVC. Preferred ranges for plasticizers are 20 to 45 phr, more preferably 35 to 40 phr. The PVC may preferably have a density between 1 g/cm$^3$ and 1.5 g/cm$^3$, such as between 1.2 g/cm$^3$ and 1.3 g/cm$^3$.

The wearing layer is optionally provided with wearing particles, for example $Al_2O_3$ particles. The PVC is typically free from fillers. The layer may be supplied as film or as emulsion or (micro-) suspension polymerization layers, by calendering or as a plastisol layer.

As finishing layer, the sheet vinyl may further comprise a varnish layer or coating on top of the wearing layer, which consists of polyurethane (PU), for example a UV-curing PU layer. The thickness may be up to 20, even 30 μm, but is preferably about 10 μm thick.

The top layer may be provided on its upper side with a relief, which can be pressed into it by embossing during production.

All the aforementioned PVCs are preferably obtained by emulsion or (micro-) suspension polymerization and have a K value between 50 and 90.

According to some embodiments, one or more reinforcing layers may be attached to or embedded in the sheet vinyl, in the flexible or semi-rigid PVC layer.

The at least one, but possibly two or more reinforcing layers are preferably textile reinforcing layers. The textile layer preferably comprises a glass-fiber textile, for example a nonwoven glass-fiber textile or a woven glass-fiber textile. This glass-fiber textile preferably has a weight per unit area from 15 to 80, such as from 25 to 55 g/m$^2$. Preferably, a woven glass-fiber textile has an open structure, for example a gauze structure or gauze fabric. Preferably the open space between successive warp or weft yarns may be between 1 mm and 1 cm.

The total sum of weights per unit area of the reinforcing layers in the sheet vinyl together have a weight per unit area of preferably more than 30 g/m$^2$, more preferably more than 50 g/m$^2$, such as between 30 and 180 g/m$^2$.

In the case that the top layer comprises sheet vinyl, these sheet vinyl elements generally have a larger area, and are delivered in rolls between 0.5 and 4 m wide and 2.5 to 10 m long. However, smaller rolls with a limited width from 0.5 to 1.5 m, for example about 1 meter, may be manufactured. Smaller areas may be cut from these large areas, with the area matching the area of the intermediate products consisting of substrate layer.

On the one hand, sheet vinyl or similar products are often produced in large volumes and dimensions. On the other hand, the substrate layer is more often first converted to substrate elements with limited dimensions. Rigid substrate elements often have a rather limited dimension, and rigid substrate elements may be available separately from stock. Simple assembly of pieces of sheet vinyl or the like as top layer on a rigid substrate element, for example by gluing or thermal adhesion, offers the advantage that the finished floor elements need not be in stock and can be produced to order. This offers the advantage that fewer products have to be in stock and often only some incomplete rolls of sheet vinyl or the like have to be stocked. Production that can be changed over quickly can be obtained in consequence.

The floor elements preferably have a rectangular or square surface with a short side between 8 and 50 centimeters (preferably between 12 and 30 cm) and a long side between 0.5 and 2 meters (preferably between 1 and 1.2).

According to a first embodiment aspect, the substrate layer may be a wood-based substrate layer.

The rigid substrate layer may be a wood-based substrate, for example wood fiber board HDF, MDF, chipboard, and the like.

For chipboard for example, single-layer or multilayer chipboard may be used. Or a board consisting of a combination of wood chips and wood fibers may be used, whether or not mixed intimately, and/or whether or not layered with wood-fiber layers on the outer side and/or layered with other (for example finer) wood chips on one or both outer sides.

In the wood-based substrates, wood-based material may be bonded together with resins, for example melamine resins, isocyanates, such as methylene diphenyl diisocyanate (MDI), and/or formaldehyde resins.

The density of the MDF or HDF is preferably above 450 g/m$^3$, better still above 750 g/m$^3$. Thicknesses between 2 and 10 mm may be used, for example.

According to a second embodiment aspect, the substrate layer may be a substrate layer based on hydraulic or nonhydraulic binders.

In the case that the substrate layer is a cement-based substrate layer, the cement may be hydraulic cement or nonhydraulic cement. Examples of suitable hydraulic cement are Portland cements. The substrate layer is preferably a fiber-cement board comprising Portland cement, optionally sand, and cellulose fibers. Optionally this board further comprises other fibers, for example polyvinyl alcohol fibers, as further specified. This fiber-cement board may be hardened in the air or under the action of temperature and pressure (for example in an autoclave).

Examples of nonhydraulic cements are inter alia magnesium-based cement, such as magnesium oxide-based cement, for example magnesium oxychloride cement (Sorel cement), magnesium oxysulfate cement and basis magnesium sulfate cement. The substrate layer is preferably a magnesium oxide board, optionally further comprising cellulose, glass or wood fibers.

In an alternative form, the hydraulic binder may be calcium sulfate, for example in the case that the substrate is a plasterboard, or comprises fly ash, blast-furnace slag or (quick) lime.

Besides the binder, the substrate layer optionally further comprises fibers, for example polymer fibers or natural fibers, for example cellulose fibers, polypropylene fibers, polyethylene fibers, polyester fibers, polyamide fibers, aromatic polyamide fibers, carbon fibers, metal fibers, polyvinyl alcohol fibers, glass fibers, wood fibers or wood chips and the like and mixtures of these fibers.

Besides binder, the substrate layer optionally further comprises fillers such as sand, gravel, calcium silicate hydrate particles or gel, $CaCO_3$, limestone, lightweight fillers, polymer particles, for example beads, expanded or unexpanded polystyrene particles, expanded or unexpanded perlite, xonotlite, vermiculite, blown clay, blast-furnace slags, pyrogenic silica (fumed silica), silica fume, and the like.

The substrate layer based on hydraulic or nonhydraulic binders may be foamed or unfoamed. It may be obtained by physical foaming, for example by introducing, for example injecting, gas or air, by incorporating and activating foaming agents, by incorporating expandable particles, or combinations of these measures.

Densities for example between 0.85 g/cm³ and 2 g/cm³, for example between 0.85 g/cm³ and 1.5 g/cm³ are usable.

Thicknesses between 2 and 10 mm may for example be used, for example for the substrate layer.

Substrate layers based on hydraulic or nonhydraulic binders have inter alia the advantage that these substrate layers are usually of low flammability or are nonflammable, and are often water-resistant. Also, their intrinsically high weight per volume ensures that floor elements with these substrate layers are robust and remain in place more easily once installed.

The combination according to this aspect of the invention leads to minimal expansion with temperature change. The polymer top layer and the substrate layer based on hydraulic or nonhydraulic binders may have very similar thermal expansion coefficients, so that a very stable product is obtained. It has the additional advantage that these expansion coefficients are small and barely need to be taken into account with the provision of expansion joints between the elements.

Sound reflection is also noticeably improved. This is generally the case with products according to all aspects of the invention.

According to another possibility, the substrate layer may be stable enough that it is able to mitigate the potential dimensional change in the top layer and the floor element as a whole. This is the case, for example, when the substrate layer is based on Portland cement or on magnesium oxide cement and the top layer comprises a polymer layer. Therefore, according to a particular independent aspect, the invention relates to a floor element in which this floor element comprises a substrate layer and a top layer applied on top thereof, in which the substrate layer is based on Portland cement or on magnesium oxide cement and in which the top layer comprises a polymer layer.

A floor element with the features of the above particular independent aspect may further exhibit the features of the aforementioned first aspect and/or the preferred embodiments thereof.

The polymer layer, which, according to the above independent aspect, is comprised in the top layer, is preferably a layer that is located between a decorative print and the substrate layer. Preferably, the polymer layer is a PVC layer, preferably a rigid PVC layer, for example with a plasticizer content of less than 5 phr. Of course, it is also possible for the PVC layer in question to be a flexible or semi-rigid PVC layer.

A further backing layer may be applied on the side of the substrate layer that is turned away from the top layer. Preferably, the further backing layer comprises or consists of the same polymer as said polymer layer.

According to the most preferred embodiment of the first and/or the above particular independent aspect, the substrate layer exhibits a thickness that corresponds to at least half of the thickness of the floor element and/or a thickness of at least 3 millimeters.

The polymer layer and/or the backing layer mentioned in the first and/or the above particular independent aspect preferably exhibits a thickness that is smaller than the thickness of the substrate layer, and/or a thickness of 2 millimeters or less.

The decorative layer mentioned in the first and/or the above particular independent aspect may comprise a print that is formed on the polymer layer or comprise a print that is located on a carrier, such as on a paper or polymer sheet. In the case of a print that is formed on the polymer layer, one or more preparation layers such as adhesion layers and/or colored or white background layers are preferably located between the print and the polymer layer.

According to a particular possibility of the first and/or the particular independent aspect, the top layer comprises a decorative layer and a wearing layer in the form of a paper- and melamine-based laminate.

According to a third embodiment aspect of the first aspect, the substrate may be a polymer-based substrate.

Although preferably manufactured from nonpolymeric material, the rigid substrate layer may be manufactured from polymer, for example thermoplastic or thermosetting polymer. Examples of polymer materials are polyester (PES), polypropylene (PP), polyethylene (PE), polyamide (PA), polyvinyl chloride (PVC), polystyrene (PS), polycarbonate (PC) and the like, and mixtures of these polymers.

The polymers may further comprise additives such as plasticizers, antioxidants, UV protectors, fireproofing additives, coloring matter and pigments, antistatic additives, or fillers such as lightweight fillers (for example pyrogenic silica (fumed silica), silica fume) and the like, $CaCO_3$, calcium silicate hydrate particles or gel, limestone, expanded or unexpanded polystyrene particles, expanded or unexpanded perlite, xonotlite, vermiculite, blown clay, blast-furnace slags, pyrogenic silica (fumed silica), silica fume, and the like.

Preferably a polymer-based substrate is highly filled, i.e. comprises more than 40 wt % of fillers.

Preferably a polymer-based substrate comprises less than 12 phr of plasticizers. Phr of an ingredient in a polymer matrix signifies "parts per hundred resin", and gives the parts by weight of the ingredient in question, per hundred parts by weight of polymer.

The polymer may be foamed or unfoamed. It may be obtained by physical foaming, for example by introducing, for example injecting, gas or air, by incorporating and activating foaming agents, by incorporating expandable particles, or combinations of these measures.

Densities of the substrate layer, more specifically of the polymer-based substrate, between 0.8 and 1.2 kg/l may be used, and the thicknesses may preferably vary between 2 and 10 mm.

According to all embodiment aspects, the top layer and the substrate layer may be glued together by means of an adhesive.

The adhesives used are preferably hot melt moisture cured adhesives (HMMC adhesives). An example is a PU HMMC adhesive.

Preferably between 50 and 150 g/m² of adhesive is applied.

Optionally a primer is applied on the side of the substrate layer that is to come in contact with the top layer. Optionally a primer is applied on the side of the top layer that is to come in contact with the substrate layer.

In an alternative embodiment, top layer and substrate layer are bonded together by a double-sided adhesive film. Optionally a primer is applied on the side of the substrate layer and/or top layer that is to come in contact with the film.

According to some embodiments of the first aspect, the top layer and the substrate layer may be attached to one another by thermal adhesion, for example thermal laminating.

According to some embodiments of the first aspect, a further backing layer may be applied to the side of the substrate layer turned away from the top layer.

This backing layer preferably consists of foamed polymer, for example expanded polyethylene. The thickness of this backing layer is preferably between 1 and 5 mm. The density of this backing layer is preferably between 15 and 50 kg/m$^3$.

The backing layer is preferably attached by means of adhesive. The adhesive used is preferably hot melt moisture cured adhesive (HMMC adhesives). An example is a PU HMMC adhesive.

Preferably between 10 and 50 g/m$^2$ of adhesive is applied.

The floor element may, according to all aspects of the invention, preferably be provided with coupling means on at least two, preferably four sides, which allow similar floor elements to be connected together. These coupling means may be any known coupling means, such as "fold down" coupling means, tooth and groove coupling means, click systems. The coupling means may be designed so that horizontal and/or vertical movement of two adjacent coupled floor elements is prevented.

The independent and dependent claims present specific and preferred features of the embodiments of the invention. Features of the dependent claims may be combined with features of the independent and dependent claims, or with features described above and/or hereunder, and in any suitable manner such as would be apparent to a person skilled in the art.

The aforementioned and other features, properties and advantages of the present invention will be explained by means of the following examples of embodiments, optionally in combination with the drawings.

The description of these examples of embodiments is given by way of explanation, without any intention of limiting the scope of the invention. The reference numbers in the description given hereunder refer to the drawings. The same reference numbers in optionally different FIGURES refer to identical or similar elements.

For better illustration of the features of the invention, some preferred embodiments are described hereunder, as examples without any limiting character, referring to the appended drawings, in which:

FIG. 1: is a schematic diagram of a floor element according to the invention.

The present invention is described hereunder making use of specific embodiments.

It should be noted that the term "comprising", for example such as used in the claims, is not to be interpreted in a limiting sense, limiting to the elements, features and/or steps then following. The term "comprising" does not exclude the presence of other elements, features or steps.

Thus, the extent of an expression "an object comprising the elements A and B" is not limited to an object that only contains the elements A and B. The extent of an expression "a method comprising the steps A and B" is not limited to a method that only contains the steps A and B.

In the light of the present invention, these expressions only signify that the relevant elements or steps for the invention are the elements or steps A and B.

In the specification given hereunder, reference is made to "an embodiment" or "the embodiment". A reference of this kind signifies that a specific element or feature, described on the basis of this embodiment, is comprised in at least this one embodiment.

The occurrence of the terms "in an embodiment" or "in the embodiment" in different places in this description, however, does not necessarily refer to the same embodiment, although it may well refer to one and the same embodiment.

Moreover, the properties or the features may be combined in any suitable manner in one or more embodiments, as would be evident to a person skilled in the art.

A floor element 100 is shown in FIG. 1.

The floor element 100 comprises a top layer 102 attached to a substrate layer 104, in which the top layer is itself layered, comprising
- a polymer backing layer 122,
- a flexible or semi-rigid polymer layer 124, to which at least one reinforcing layer 126 is attached, and
- a finishing layer comprising a decorative layer 132, a wearing layer 134 and a coating 136 on the outer side.

The backing layer 122 is unfoamed flexible PVC; it has a thickness between 0.5 and 3 mm and comprises between 55 and 65 phr of plasticizer. This layer also comprises 100 to 125 phr of filler, mainly $CaCO_2$.

The flexible or semi-rigid polymer layer 124 is foamed flexible PVC; it has a thickness from 0.5 to 3 mm and also comprises 55 to 65 phr of plasticizer and 100 to 125 phr of filler, preferably $TiO_2$.

A textile reinforcing layer is attached to this layer 124. The textile reinforcing layer comprises a glass-fiber web with a weight per unit area from 35 to 50 g/m$^2$, which is fully impregnated with flexible PVC. The PVC used for impregnation is similar to the PVC used for layer 124. This layer is about 0.35 to 0.6 mm thick. All PVC preferably has a K value between 67 and 75.

The decorative layer 132 is a print layer directly on layer 124. The layer is applied by rotary printing.

The wearing layer 134 is a transparent PVC layer with up to 50 phr of plasticizer and no fillers. The thickness is about 0.3 mm.

The coating 136 is a UV-curing PU varnish coat with a thickness of 15 µm.

The upper surface is provided with a relief by embossing (not shown).

This top layer 102 is attached to a substrate layer 104 by means of an adhesive 140. The substrate layer is a rigid substrate layer that consists of a fiber-cement material comprising Portland cement, sand, cellulose fibers, polyvinyl acetate fibers and which is air-cured. The substrate layer has a thickness of 4 mm.

The adhesive is a PU HMMC adhesive and is applied in an amount of 80 g/m$^2$.

Under the rigid substrate, the floor element 100 is provided with a backing layer 150, which consists of foamed PVC of a good 1 mm thickness. The density is between 35 and 120 g/m$^3$. The backing layer is attached to the substrate with a PU HMMC adhesive, applied in an amount of 15 g/m$^2$.

In an alternative embodiment, the substrate layer made of fiber-cement was replaced with HDF board.

In an alternative embodiment, the substrate layer made of fiber-cement was replaced with a substrate based on magnesium oxychloride cement (MgO) with similar characteristics as applied for the fiber-cement embodiment.

In an alternative embodiment, the substrate layer made of fiber-cement was replaced with a substrate based on rigid PVC. The substrate layer is between 2.2 and 8.2 mm thick and is formed from PVC with less than 10 phr of plasticizer and 100 to 300 phr of filler, preferably $CaCO_3$. This substrate may be foamed or unfoamed and may have a density between 0.8 and 2.1 kg/l.

It is clear that although the embodiments and/or the materials for supplying embodiments according to the present invention have been discussed, various changes or modifications may be made without departing from the scope and/or the spirit of the present invention. The present invention is by no means limited to the embodiments described above, but may be carried out according to different variants while remaining within the scope of the present invention.

The invention claimed is:

1. A floor element, wherein this floor element comprises a substrate layer and a top layer applied on top thereof, wherein said top layer and said substrate layer have an essentially matching surface area, wherein the substrate layer is based on Portland cement or on magnesium oxide cement and wherein the top layer comprises a polymer layer, a carrier layer provided with a decorative print and a wearing layer; wherein said polymer layer is located between said carrier layer provided with said decorative print and the substrate layer; wherein said polymer layer is a rigid PVC layer with a plasticizer content of less than 10 phr; and wherein the substrate layer exhibits a thickness that corresponds to at least half of the thickness of the floor element and exhibits a thickness of at least 3 millimeters, wherein a further polymer layer is applied on the side of the substrate layer that is turned away from the top layer, said further polymer layer being a rigid PVC layer with a plasticizer content of less than 10 phr, wherein said polymer layer has a thickness of at least 1 millimeter and said thickness of said polymer layer is smaller than said thickness of said substrate layer and said further polymer layer has a thickness of 2 millimeters or less, wherein said polymer layer and said further polymer layer are applied to a respective side of said substrate layer by means of an adhesive.

2. The floor element in accordance with claim 1, wherein said polymer layer exhibits a thickness of 2 millimeters or less.

3. The floor element of claim 1, wherein said top layer further comprises a coating on an outer side of said floor element.

4. The floor element of claim 3, wherein said coating is a UV cured layer.

5. The floor element of claim 1, wherein a textile reinforcement layer is attached to said polymer layer.

6. The floor element of claim 1, wherein said polymer layer further comprises fillers.

7. The floor element of claim 1, wherein said carrier layer is a PVC film.

8. The floor element of claim 1, wherein the wearing layer is a PVC layer having a thickness between 0.15 mm and 1 mm and wherein said wearing layer is transparent and free from fillers.

9. The floor element of claim 8, wherein said wearing layer comprises more than 20 phr of plasticizer.

10. A floor element, wherein this floor element comprises a substrate layer and a top layer applied on top thereof,
    wherein the substrate layer is based on Portland cement or on magnesium oxide cement,
    wherein the substrate layer exhibits a thickness that corresponds to at least half of the thickness of the floor element and exhibits a thickness of at least 3 millimeters;
    wherein said top layer comprises a polymer layer, a PVC film provided with a print and a wearing layer,
    wherein a textile reinforcement layer is attached to said polymer layer,
    wherein the wearing layer is a PVC layer having a thickness between 0.15 mm and 1 mm and wherein said wearing layer is transparent and free from fillers,
    wherein said polymer layer is located between said PVC film and the substrate layer; wherein said polymer layer is a rigid PVC layer with a plasticizer content of less than 10 phr;
    wherein a further polymer layer is applied on the side of the substrate layer that is turned away from the top layer, said further polymer layer being a rigid PVC layer with a plasticizer content of less than 10 phr;
    wherein said polymer layer has a thickness of at least 1 millimeter and said thickness of said polymer layer is smaller than said thickness of said substrate layer and said further polymer layer has a thickness of 2 millimeters or less, wherein said polymer layer and said further polymer layer are applied to a respective side of said substrate layer by means of an adhesive.

11. The floor element in accordance with claim 10, wherein said polymer layer exhibits a thickness of 2 millimeters or less.

12. The floor element of claim 10, wherein said top layer further comprises a coating on an outer side of said floor element.

13. The floor element of claim 12, wherein said coating is a UV cured layer.

14. The floor element of claim 10, wherein said polymer layer further comprises fillers.

15. The floor element of claim 10, wherein said wearing layer comprises more than 20 phr of plasticizer.

* * * * *